United States Patent
Park et al.

(10) Patent No.: US 9,935,716 B2
(45) Date of Patent: Apr. 3, 2018

(54) OPTICAL MODULATORS AND DATA PROCESSING SYSTEMS USING THE SAME

(71) Applicant: Samsung Electronics Co., Ltd., Suwon-si, Gyeonggi-do (KR)

(72) Inventors: Yong-sang Park, Seoul (KR); Hyun-il Byun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/230,384

(22) Filed: Aug. 6, 2016

(65) Prior Publication Data

US 2017/0070297 A1    Mar. 9, 2017

(30) Foreign Application Priority Data

Sep. 3, 2015 (KR) .................. 10-2015-0124945

(51) Int. Cl.
*H04B 10/12* (2006.01)
*H04B 10/516* (2013.01)
*H04B 10/50* (2013.01)

(52) U.S. Cl.
CPC ......... *H04B 10/516* (2013.01); *H04B 10/505* (2013.01); *H04B 10/50572* (2013.01)

(58) Field of Classification Search
USPC ........................................ 398/195
See application file for complete search history.

(56) References Cited

U.S. PATENT DOCUMENTS

| 6,253,000 B1* | 6/2001 | Madsen ............. H04Q 11/0001 385/16 |
| 6,556,746 B1 | 4/2003 | Zhao et al. |
| 6,798,557 B1* | 9/2004 | Leven .................. H04B 10/505 359/279 |
| 6,900,898 B2 | 5/2005 | Ahmadvand et al. |

(Continued)

FOREIGN PATENT DOCUMENTS

| JP | 2010-250125 | 11/2010 |
| JP | 2011-221258 | 11/2011 |

(Continued)

OTHER PUBLICATIONS

Kaminow et al., Optical Fiber Telecommunications IV A: Components, 2002, Academic Press, pp. 431-432.*

(Continued)

*Primary Examiner* — Ken N Vanderpuye
*Assistant Examiner* — Jai Lee
(74) *Attorney, Agent, or Firm* — Myers Bigel, P.A.

(57) ABSTRACT

An optical modulator includes an optical splitter splitting input optical signals into a first optical signal and a second optical signal and transmitting the first optical signal and the second optical signal to a first optical waveguide and a second optical waveguide, respectively, an optical combiner generating an output optical signal by combining the first and second optical signals transmitted from the first and second optical waveguides respectively, and including three output ports including a main output port, a first auxiliary output port, and a second auxiliary output port, three output (Continued)

optical waveguides connected to the three output ports, respectively, and transmitting the output optical signal, and an optical detector connected to at least one of the three output optical waveguides.

20 Claims, 12 Drawing Sheets

(56) References Cited

U.S. PATENT DOCUMENTS

| | | | |
|---|---|---|---|
| 7,228,019 | B2 | 6/2007 | Takahashi |
| 7,257,283 | B1 | 8/2007 | Liu et al. |
| 7,590,312 | B2 | 9/2009 | Mizuno et al. |
| 8,121,492 | B2 * | 2/2012 | Akiyama ............ H04B 10/5051 398/182 |
| 8,238,758 | B2 * | 8/2012 | Joyner ................. H04B 10/505 398/183 |
| 8,693,005 | B2 | 4/2014 | Kawanishi et al. |
| 8,772,704 | B2 | 7/2014 | Mack et al. |
| 9,020,363 | B2 * | 4/2015 | Yasuda ............ H04B 10/50575 398/183 |
| 9,031,412 | B2 | 5/2015 | Nagarajan et al. |
| 2002/0005975 | A1 * | 1/2002 | Nakamoto ............ G02F 1/0121 359/254 |
| 2003/0002117 | A1 * | 1/2003 | Naik ...................... G02F 1/3517 398/178 |
| 2003/0147591 | A1 * | 8/2003 | Doi ....................... G02F 1/0123 385/39 |
| 2004/0021829 | A1 * | 2/2004 | Griffin ................. H04B 10/505 353/30 |
| 2007/0212079 | A1 * | 9/2007 | Ooi ...................... H04B 10/505 398/198 |
| 2009/0086303 | A1 * | 4/2009 | Ide ..................... H04B 10/5053 359/279 |
| 2009/0097843 | A1 * | 4/2009 | McBrien ................. G02F 1/225 398/16 |
| 2009/0141333 | A1 * | 6/2009 | Tsunoda ................. G02F 1/0123 359/279 |
| 2013/0062508 | A1 * | 3/2013 | Kanter ................ H03M 1/1265 250/214 DC |
| 2014/0341499 | A1 | 11/2014 | Manouvrier |
| 2014/0376853 | A1 | 12/2014 | Hashimoto |
| 2015/0147018 | A1 * | 5/2015 | Itou .................... H04B 10/5053 385/3 |
| 2017/0099529 | A1 * | 4/2017 | Dupuis .............. H04Q 11/0005 |

FOREIGN PATENT DOCUMENTS

| | | |
|---|---|---|
| KR | 1020090021279 | 3/2009 |
| KR | 1020100008034 | 1/2010 |

OTHER PUBLICATIONS

Li et al. "Lossy Waveguide Design Considering Polarization Dependency to Reduce Back Reflection in 2 x 1 MMI Combiners", Optical Society of America, Oct. 20, 2014, vol. 22, No. 21, Optics Express (12 pages).

* cited by examiner

OPTICAL MODULATORS AND DATA PROCESSING SYSTEMS USING THE SAME

CROSS-REFERENCE TO RELATED APPLICATION

This application claims priority under 35 USC § 119 to Korean Patent Application No. 10-2015-0124945, filed on Sep. 3, 2015, in the Korean Intellectual Property Office, the contents of which are incorporated by reference herein in their entirety.

BACKGROUND

The inventive concept relates to optical modulators, and more particularly, to optical modulators including a Mach Zehnder interferometer (MZI).

An apparatus for transmitting data signals by using optical signals has been used in various fields, in addition to an electrical transmission apparatus. An optical modulator is a device for transmitting electrical signals by converting the electrical signals into optical signals.

The MZI, which is a type of optical modulator, may convert electrical signals into optical signals in such a way that when a phase of at least one of the lights passing through different optical waveguides is changed due to an electrical signal, an intensity of an interference optical signal changes.

SUMMARY

The inventive concept provides optical modulators capable of suppressing loss of optical signals and stably monitoring intensities of optical signals obtained by optical interferences.

According to aspects of the inventive concept, there is provided an optical modulator including an optical splitter configured to split input optical signals into a first optical signal and a second optical signal and to transmit the first optical signal and the second optical signal to a first optical waveguide and a second optical waveguide, respectively, an optical combiner configured to generate an output optical signal by combining the first and second optical signals transmitted from the first and second optical waveguides respectively, and including three output ports including a main output port, a first auxiliary output port, and a second auxiliary output port, three output optical waveguides connected to the three output ports, respectively, and configured to transmit the output optical signal, and an optical detector connected to at least one of the three output optical waveguides.

According to aspects of the inventive concept, there is provided an optical modulator including an optical splitter configured to split input optical signals into a first optical signal and a second optical signal, a phase shifter configured to modulate a phase of at least one of the first and second optical signals, an optical combiner configured to combine the first and second optical signals and including three output ports, at least one optical detector configured to receive a signal from at least one of three output optical signals that are output from the three output ports, and a controller connecting between the at least one optical detector and the phase shifter, and configured to control a phase modulation value of the phase shifter based on a detection signal measured by the at least one optical detector.

According to aspects of the inventive concept, there is provided an optical modulator including an optical splitter configured to split an input optical signal into a plurality of optical signals, an optical combiner connected to the optical splitter, configured to receive at least two of the plurality of optical signals, and configured to combine the at least two of the plurality of optical signals to generate a main output optical signal and an auxiliary output optical signal, and an optical detector connected to the optical combiner. The optical detector may be configured to receive the auxiliary output optical signal and to determine a phase and/or intensity of the main output optical signal based on a phase and/or intensity of the auxiliary output optical signal.

BRIEF DESCRIPTION OF THE DRAWINGS

Example embodiments of the inventive concept will be more clearly understood from the following detailed description taken in conjunction with the accompanying drawings in which.

DETAILED DESCRIPTION

Figure 1:
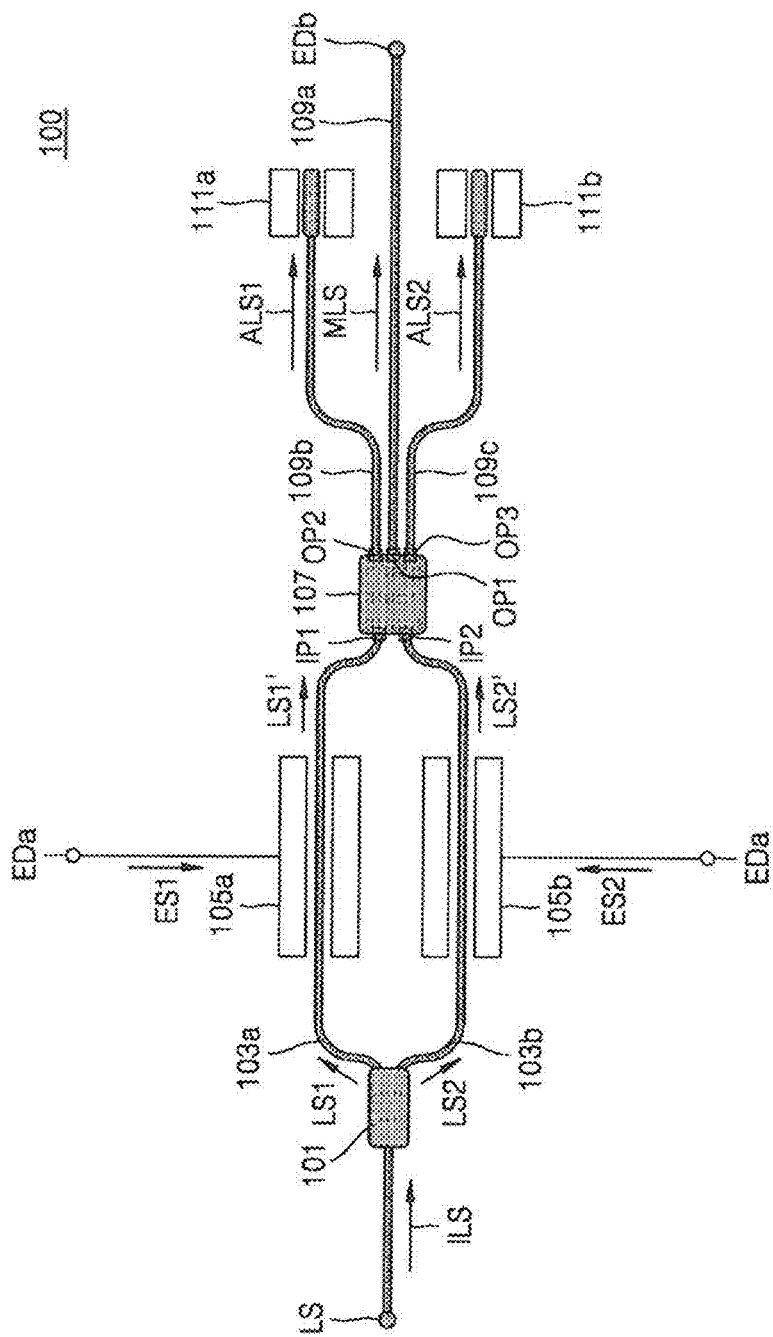
FIG. 1 is a view of an optical modulator according to example embodiments of the inventive concept.

In the drawings, the same elements are denoted by the same reference numerals and a repeated explanation thereof will not be given.

Expressions such as "at least one of," when preceding a list of elements, modify the entire list of elements and do not modify the individual elements of the list.

The terms first, second, third etc. are only used to distinguish one element, component, region, layer, or section from another region, layer, or section.

It will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present. Like numerals refer to like elements throughout. As used herein, the term "and/or" includes any and all combinations of one or more of the associated listed items.

The terminology used herein is for the purpose of describing particular example embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A specific process order may be changed in another embodiment. For example, two processes which are described as being continuously performed may be simultaneously performed or may be performed in a reverse order.

As such, variations from the shapes of the illustrations as a result, for example, of manufacturing techniques and/or tolerances, are to be expected.

Figure 2:
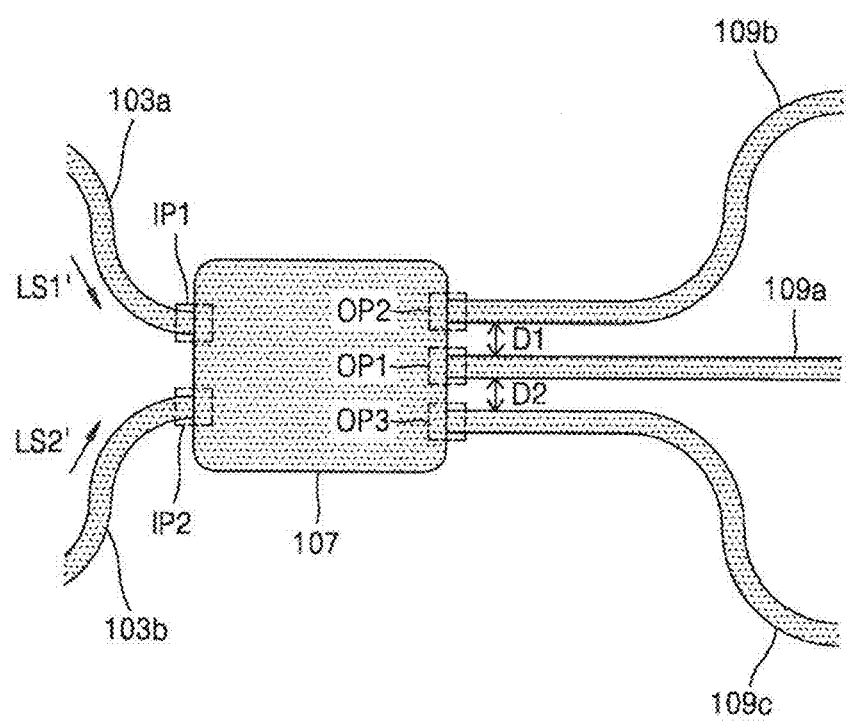
FIG. 2 is a view of a detailed arrangement of a main optical waveguide and first and second optical waveguides according to example embodiments of the inventive concept.
Figure 3:
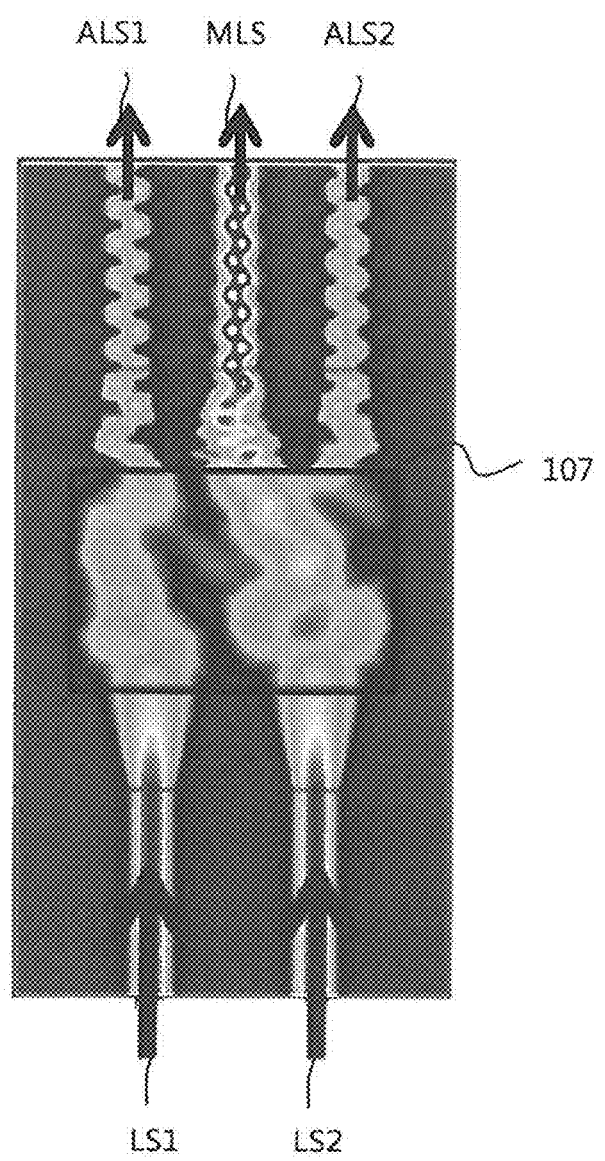
FIG. 3 is a view of an image of an optical flow transmitted via an optical modulator according to example embodiments of the inventive concept.

FIG. 1 is a view of an optical modulator 100 according to example embodiments of the inventive concept. FIG. 2 is a view of a detailed arrangement of a main optical waveguide 109a and first and second optical waveguides 109b and 109c according to example embodiments of the inventive concept. FIG. 3 is a view of an image of an optical flow transmitted via the optical modulator 100 according to example embodiments of the inventive concept.

Referring to FIG. 1, the optical modulator 100 may include an optical splitter 101, an optical combiner 107 including two input ports, namely, first and second input ports IP1 and IP2, and three output ports OP1, OP2, and OP3, three optical waveguides, namely, the main optical waveguide 109a and the first and second auxiliary optical waveguides 109b and 109c, connected to the three output ports OP1, OP2, and OP3, respectively, and optical detectors, namely, first and second optical detectors 111a and 111b, connected to some of the three optical waveguides 109a/109b/109c. In some embodiments, the first and second optical detectors 11a and 11b are connected to the first and second auxiliary optical waveguides 109b and 109c, respectively.

The optical combiner 107 may output certain output optical signals generated by the optical combiner 107 to the outside via the three output ports OP1, OP2, and OP3, thereby suppressing generation of internal reflective light in the optical combiner 107. Thus, the optical modulator 100 may stably operate.

Also, the optical combiner 107 may include the main output port DPI used for signal transmission, the first auxiliary output port OP2 for transmitting a first auxiliary optical signal ALS1 to the first optical detector 111a and the second auxiliary output port OP3 for transmitting a second auxiliary optical signal ALS2 to the second optical detector 111b. The first and second optical detectors 111a and 111b may measure intensities and phases of the first and second auxiliary optical signals ALS1 and ALS2 and based on the measured intensities and phases of the first and second auxiliary optical signals ALS1 and ALS2, the first and second optical detectors 111a and 111b may calculate an intensity and a phase of a main optical signal MLS output from the main output port OP1, which is used for signal transmission. In other words, since signals are not directly extracted front the main optical signal MLS to measure the intensity and the phase of the main optical signal MLS, loss of the main optical signal MLS may be reduced or prevented.

In detail, the optical splitter 101 may split input optical signals ILS into a first optical signal LS1 and a second optical signal LS2. The input optical signals ILS may have continuous waveforms output from a light source LS. The first and second optical signals LS1 and LS2 may be split to have the same intensity. The split first and second optical signals LS1 and LS2 may be transmitted to a first optical waveguide 103a and a second optical waveguide 103b, respectively, which are connected to the optical splitter 101. The optical splitter 101 of the optical modulator 100 is illustrated as a multi-mode interferometer (MMI), however the present inventive concept is not limited thereto, In some embodiments,. the optical splitter 101 may be replaced by a directional coupler, a Y-branch, or any device that performs an optical signal splitting function.

A first electrode 105a may be formed adjacent to the first optical waveguide 103a, The first electrode 105a may modulate a phase of the first optical signal LS1 passing through the first optical waveguide 103a, in response to a first electrical signal ES1 generated from an electronic device EDa or an external input. A first modulated optical signal LS1', a phase of which is changed according to the first electrical signal ES1, may be input to the optical combiner 107 via the first input port IP1. Likewise, a second electrode 105b may be formed adjacent to the second optical waveguide 103b. The second electrode 105b may modulate a phase of the second optical signal LS2 passing through the second optical waveguide 103b, in response to a second electrical signal ES2 generated from the electronic device EDa or an external input. A second modulated optical signal LS2', a phase of which is changed according to the second electrical signal ES2, may be input to the optical combiner 107 via the second input port IP2. Thus, the first modulated optical signal LS1' having the changed phase due to the first electrode 105a and the second modulated optical signal LS2 having the changed phase due to the second electrode 105b may be combined in the optical combiner 107 to generate output optical signals MLS, ALS1, and ALS2.

The first and second electrodes 105a and 105b may be located in the first and second optical waveguides 103a and 103b, respectively. However, the present inventive concept is not limited thereto. In some embodiments, only one of the first and second electrodes 105a and 105b may be present. For example, only the first electrode 105a may be present in the first optical waveguide 103a, and the second electrode 105b may not be present in the second optical waveguide 103b. in this case, the first modulated optical signal LS1' having the changed phase due to the first electrode 105a may be combined with the second optical signal LS2 in the optical combiner 107 and generate the output optical signals, namely, the main optical signal MLS and the first and second auxiliary optical signals ALS1 and ALS2.

Also, the shapes of the first and second electrodes 105a and 105b are example embodiments, and the first and second electrodes 105a and 105b may have different predetermined shapes which may modulate phases of the first and second optical signals LS1 and LS2 passing through the first and second optical waveguides 103a and 103b.

The optical combiner 107 may receive the first and second modulated optical signals LS1' and LS2' transmitted via the first and second optical waveguides 103a and 103b, respectively, via the first and second input ports IP1 and IP2, respectively. The optical combiner 107 may combine the input first and second modulated optical signals LS1' and LS2' and generate the output optical signals MLS, ALS1, and ALS2. The output optical signals MLS, ALS1, and ALS2 may have different output shapes according to a phase difference of the first and second optical signals LS1' and LS2' passing through the first and second optical waveguides 103a and 103b.

That is, when there is no phase difference between the first and second modulated optical signals LS1' and LS2', only the main optical signal MLS proceeding along the center of the optical combiner 107 may be generated. Thus, all the main optical signals MLS may be output via the main output port OP1 located in the center of the optical combiner 107. That is, there may be substantially no optical signals that are output via the first auxiliary output port OP2 and the second auxiliary output port OP3 located at both sides of the main optical port OP1.

However, when there is a phase difference between the first and second modulated optical signals LS1' and LS2', in addition to the main optical signal MLS proceeding along the center of the optical combiner 107, the first and second auxiliary optical signals ALS1 and ALS2 proceeding adjacent to both edges of the optical combiner 107 may be generated. In this case, the main optical signal MLS proceeding along the center of the optical combiner 107 may be output via the main output port OP1, and the first and second auxiliary optical signals ALS1 and ALS2 proceeding adjacent to both edges of the optical combiner 107 may be output via the first and second auxiliary output ports OP2 and OP3 located adjacent to both edges of the optical combiner 107, at both sides of the main output port OP1.

General optical modulators not having the benefit of the present inventive concept may include a general optical combiner having only one main output port. Thus, when first and second modulated optical signals provided to the general optical combiner have a phase difference, other optical signals proceeding adjacent to both edges of the general optical combiner may be generated. Since the general optical combiner has only the main output port located in the center thereof, other optical signals proceeding adjacent to the both edges of the general optical combiner may not be output to the outside and may be repeatedly reflected in the general optical combiner. The optical signals that are not output to the outside may disturb other optical signals and interrupt a stable optical conversion which may deteriorate the performance of the general optical modulator.

However, according to the optical modulator 100 according to the present inventive concept, even if there is a phase difference between the first and second modulated optical signals LS1' and LS2' so that there are the main optical signal MLS proceeding along the center of the optical combiner 107 and the first and second optical signals ALS1 and ALS2 proceeding adjacent to both edges of the optical combiner 107, the main optical signal MLS and the first and second optical signals ALS1 and ALS2 may be output via the three output ports OP1, OP2, and OP3, respectively. Accordingly, the reflective light is reduced or not formed in the optical combiner 107, and the optical combiner 107 may stably operate. The optical modulator 100 may be an MMI.

Referring to FIG. 2, the optical combiner 107 and a detailed arrangement of the three output ports, namely, the main output port OP1, the first auxiliary output port OP2, and the second auxiliary output port OP3, are illustrated. The first and second auxiliary output ports OP2 and OP3 may be arranged apart from the main output port OP1 by the distances D1 and D2, with the first main output port OP1 therebetween. In some embodiments, D1 and D2 may be substantially the same distance. That is, the first distance D1 between the main output port OP1 and the first auxiliary output port OP2 may be substantially the same as the second distance D2 between the main output port OP1 and the second auxiliary output port OP3.

The first and second modulated optical signals LS1' and LS2' input to the optical combiner 107 via the first and second input ports IP1 and IP2 may be combined in the optical combiner 107 and form the output optical signals MLS, ALS1, and ALS2. The output optical signals MLS, ALS1, and ALS2 may include the main optical signal MLS formed along the center of the optical combiner 107, and the first and second auxiliary optical signals ALS1 and ALS2 formed symmetrically at both sides of the main optical signal MLS. Here, since the first and second auxiliary Output ports OP2 and OP3 are apart from the main output port OP1 by the same distances D1 and D2, the first and second auxiliary optical signals ALS1 and ALS2 having the same phases and intensities may be output via the first and second auxiliary output ports OP2 and OP3, respectively.

FIG. 3 illustrates an image of the first and second modulated optical signals LS1' and LS2' input to the optical combiner 107, the first and second modulated optical signals LS1' and LS2' combined in the optical combiner 107, and the main optical signal MLS and the first and second auxiliary optical signals ALS1 and ALS2 that are output from the optical combiner 107.

The first and second modulated optical signals LS1 and LS2 may have a predetermined phase difference while having the same optical signal intensity. When the first and second modulated optical signals LS1' and LS2' having the phase difference are combined in the optical combiner 107, output optical signals may be split due to an interference effect. That is, the output optical signals may be split into the main optical signal MLS proceeding along the center of the optical combiner 107 and the first and second auxiliary optical signals ALS1 and ALS2 proceeding along areas adjacent to both edges of the optical combiner 107.

The first and second auxiliary optical signals ALS1 and ALS2 may be transmitted to the first and second optical detectors 111a and 111b via the first and second auxiliary output ports OP2 and OP3 and the first and second auxiliary optical waveguides 109b and 109c connected to the first and second auxiliary output ports OP2 and OP3.

Referring to FIG. 1 again, the main output port OP1 and the first and second auxiliary output ports OP2 and OP3 of the optical combiner 107 may be connected to the main optical waveguide 109a and the first and second auxiliary optical waveguides 109b and 109c, respectively. The main optical waveguide I 09a may transmit the main optical signal MLS to another electronic device EDb. The first and second auxiliary optical waveguides 109b and 109c may respectively transmit the first and second auxiliary optical signals ALS1 and ALS2 to the first and second optical detectors 111a and 111b.

The first and second optical detectors 111a and 111b may photo-electrically convert the first and second auxiliary optical signals ALS1 and ALS2 and evaluate the propriety of the conversion by the first and second electrical signals ES1 and ES2.

Although the first and second optical detectors 111a and 111b connected to the first and second auxiliary optical waveguides 109b and 109c, respectively, are illustrated, the present inventive concept is not limited thereto. The optical modulator 100 may include only one of the first and second optical detectors 111a and 111b. That is only one of the first and second auxiliary optical waveguides 109b and 109c, for example, only the first auxiliary optical waveguide 109b may be connected to the first optical detector 111a.

However, in an embodiment where the second optical detector 111b is omitted in the optical modulator 100, the second auxiliary optical waveguide 109c may be included, in this embodiment, the second auxiliary optical signal ALS2 may be output to the outside by including the second auxiliary optical waveguide 109c, and thus, the second auxiliary optical signal ALS2 may be prevented from functioning as reflective light in the optical combiner 107.

In optical modulators not benefiting from the present inventive concept, in order to monitor the optical signals converted by an optical modulator, a method of directly divaricating at least one signal from the main optical signals MLS transmitted to another electronic device EDb is used. That is, components, such as a tap coupler and a Y-branch structure, may be included in a middle position of a main optical waveguide. The optical signal obtained by the tap coupler or the Y-branch structure is monitored by an optical detector. The method of using the components, such as the tap coupler and the Y-branch structure, is accompanied by partial loss of the main optical signal. Since the main optical signal has to be transmitted to the other electronic device EDb to be used as data, the loss of the main optical signal may deteriorate the performance of the optical modulator.

However, the optical modulator 100 according to the present inventive concept may monitor the main optical signal MLS, without substantial deterioration or loss of the main optical signal MLS, by using the first and second auxiliary optical signals ALS1 and ALS2 formed in different paths from the main optical signal MLS. That is, the optical modulator 100 may not include an optical waveguide which is divaricated from the main optical waveguide 109a and connected to an optical detector.

The main optical signal MLS may be output via the maim output port OP1 without substantial deterioration or loss, and the first and second auxiliary optical signals ALS1 and ALS2 may be output via the first and second auxiliary output ports OP2 and OP3. If the first and second auxiliary optical signals ALS1 and ALS2 are not output via the first and second auxiliary output ports OP2 and OP3, the first and second auxiliary optical signals ALS1 and ALS2 may not affect an intensity of the main optical signal MLS, and rather, the first and second auxiliary optical signals ALS1 and ALS2 may generate reflective light in the optical combiner 107 and destabilize the optical modulator 100.

The first and second auxiliary optical signals ALS1 and ALS2 and the main optical signal MLS may have a particular relation with respect to a phase and an intensity, and thus, the main optical signal MLS may be indirectly monitored by detecting the first and second auxiliary optical signals ALS1 and ALS2. The particular relation between the first and second auxiliary optical signals ALS1 and ALS2 and the main optical signal MLS will be described herein.

In some embodiments, the optical splitter 101, the first and second optical waveguides 103a and 103b, the first and second electrodes 105a and 105b, the optical combiner 107, the output optical waveguides, namely, the main optical waveguide 109a and the first and second auxiliary optical waveguides 109b and 109c, and the first and second optical detectors 111a and 111b may be arranged on or in a semiconductor substrate.

Figure 4:
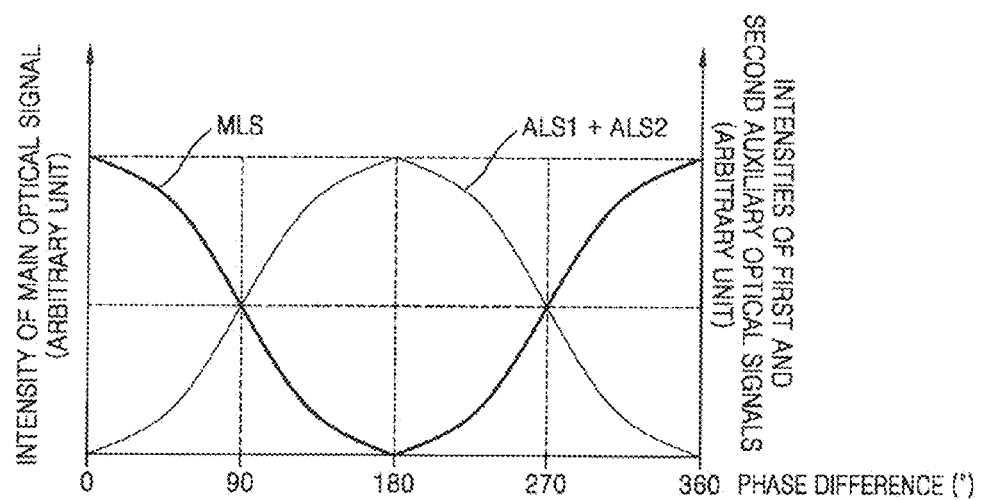
FIG. 4 is a graph of an intensity of a main optical signal and intensities of first and second auxiliary optical signals, depending on a phase difference between a first optical signal and a second optical signal, according to example embodiments of the inventive concept.

FIG. 4 is a graph of an intensity of the main optical signal MLS and intensities of the first and second auxiliary optical signals ALS1 and ALS2, depending on a phase difference of the first and second modulated optical signals LS1' and LS2', according to example embodiments of the inventive concept.

Referring to FIGS. 1 and 4, the input optical signal ILS may pass through the optical splitter 101 to output the first and second optical signals LS1 and LS2 having the same phase and the same intensity. The first and second optical signals LS1 and LS2 may be transmitted to the first and second optical waveguides 103a and 103b, respectively.

The first and second electrodes 105a and 105b may receive the first and second electrical signals ES1 and ES2 generated from the electronic device EDa or an external input and may modulate phases of the first and second optical signals LS1 and LS2 passing through the first and second optical waveguides 103a and 103b. The first and second modulated optical signals LS1' and LS2', the phases of which are modulated, may be input to the optical combiner 107 via the first and second input ports IP1 and IP2.

When the first and second electrical signals ES1 and ES2 are the same, the first and second optical signals LS1 and LS2 are modulated to have the same phase. That is, a phase difference of the first and second modulated optical signals LS1' and LS2' may be 0°, and all output optical signals formed when the first and second modulated optical signals LS1' and LS2' are combined may be output as the main optical signal MLS.

When the first and second electrical signals ES1 and ES2 are different from each other, the first and second optical signals LS1 and LS2 may be modulated to have a phase difference. That is, the phase difference between the first and second modulated optical signals LS1' and LS2' may not be 0°. In this case, all output optical signals formed when the first and second modulated optical signals LS1' and LS2' are combined may be split into the main optical signal MLS and the first and second auxiliary optical signals ALS1 and ALS2. In this case, all output optical signals are divided into two parts, that is, the main optical signal MLS, and a sum of the first and second auxiliary optical signals ALS1 and ALS2. Thus, a phase difference between the first and second modulated optical signals LS1' and LS2' may be detected by detecting intensities of the first and second auxiliary optical signals ALS1 and ALS2 by using the first and second optical detectors 111a and 111b, and calculating a ratio of the intensities of the first and second auxiliary optical signals ALS1 and ALS2 to the total intensity of all the output optical signals, in some embodiments, a phase difference between the first and second modulated optical signals LS1' and LS2' may be detected by obtaining an intensity of the main optical signal MLS by removing the intensities of the first and second auxiliary optical signals ALS1 and ALS2 from the total intensity of the output optical signals, and calculating a ratio of the intensity of the main optical signal MLS to the total intensity of the output optical signals.

Accordingly, data with respect to the first and second electrical signals ES1 and ES2 that have generated the phase difference of the first and second modulated optical signals LS1' and LS2' may be obtained. A corresponding relation between the phase difference of the first and second modulated optical signals LS1' and LS2', and the first and second electrical signals ES1 and ES2 may be obtained by using result data of preceding experiments with respect to a phase difference value depending on a change of an electrical signal value.

Figure 5A:
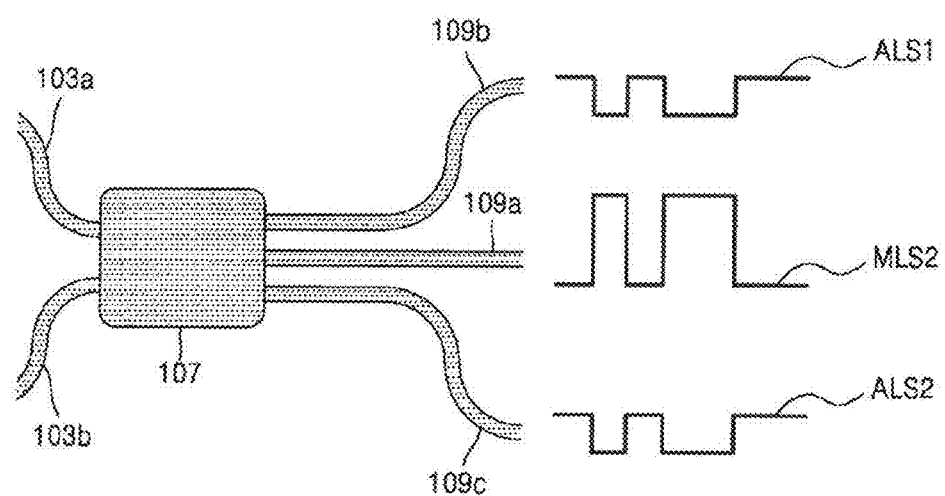
FIGS. 5A and 5B are respectively a view and a graph of an intensity of a main optical signal and intensities of first and second auxiliary optical signals, according to example embodiments of the inventive concept.
Figure 5B:
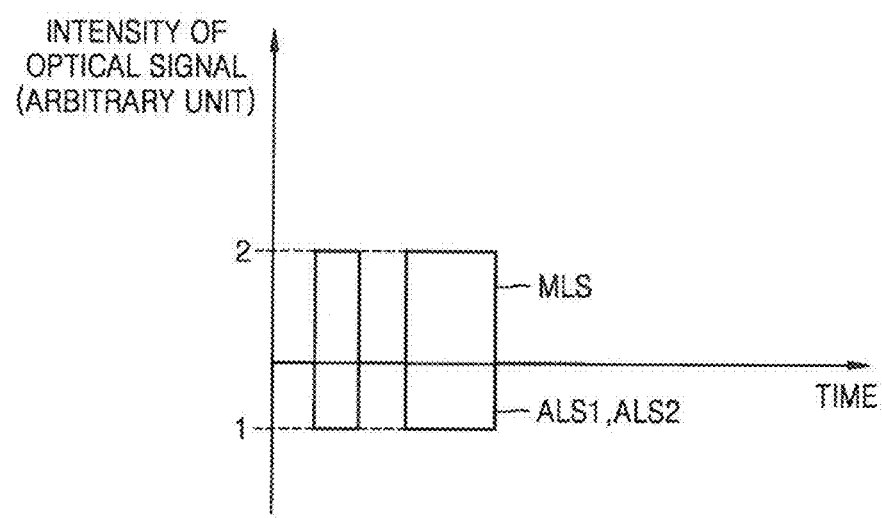

FIGS. 5A and 5B are respectively a view and a graph of an intensity of the main optical signal MLS and intensities of the first and second auxiliary optical signals ALS1 and ALS2, according to example embodiments of the inventive concept.

Referring to FIGS. 1, 5A, and 5B, the main optical signal MLS and the first and second auxiliary optical signals ALS1 and ALS2 have opposite phases, and the intensity of the main optical signal MLS is twice greater than the intensity of the first or second auxiliary optical signal ALS1 or ALS2. That is, the intensity of the main optical signal MLS may be the same as a sum of the intensities of the first and second auxiliary optical signals ALS1 and ALS2. Thus, referring to FIG. 4, a phase difference between the first and second modulated optical signals LS1' and LS2' may be 90°.

As shown above, the first and second modulated optical signals LS1' and LS2' and the first and second electrical signals ES1 and ES2 may be measured by detecting the first and second auxiliary optical signals ALS1 and ALS2. Accordingly, whether the first and second electrical signals ES1 and ES2 are accurately photo-electrically converted into the main optical signal MLS may be indirectly monitored.

Figure 6:
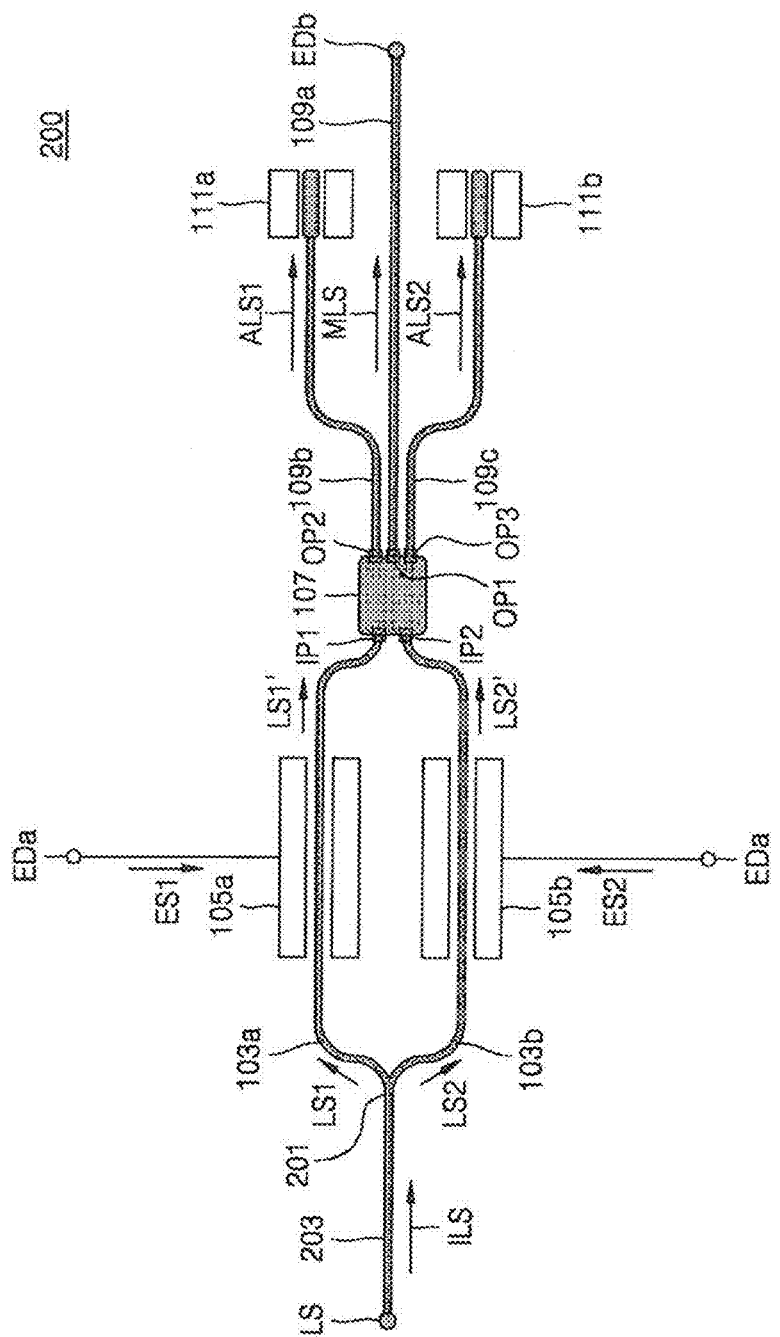
FIGS. 6 through 10 are views of optical modulators according to example embodiments of the inventive concept.

FIG. 6 is a view of an optical modulator 200 according to example embodiments of the inventive concept. The optical modulator 200 is similar to the optical modulator 100 of FIG. 1. However, the optical modulator 200 differs from the optical modulator 100 in that in the optical modulator 200, an optical splitter 201 has a Y-branch structure. Like reference numerals refer to like elements, and repeated descriptions will be omitted.

Referring to FIG. 6, an input optical waveguide 203 connected to the light source ES may be split into the first and second optical waveguides 103a and 103b according to the Y-branch structure 201. Accordingly, the input optical signal ILS generated from the light source LS may proceed along the input optical waveguide 203, and may be divaricated based on the Y-branch structure 201 to be split into the first and second optical signals LS1 and LS2 proceeding along the first and second optical waveguides 103a and 103b.

Directions in which the first and second optical waveguides 103a and 103b extend may be inclined by the same degrees as each other, based on a direction in which the input optical waveguide 203 extends. That is, divergency angles of the first and second optical waveguides 103a and 103b may become the same so that the first and second optical signals LS1 and LS2 may have the same intensity and the same phase. However, the present inventive concept is not limited thereto, and the divergency angles of the first and second optical waveguides 103a and 103b may be different from each other.

In some embodiments, the Y-branch structure 201 may be replaced by a directional coupler.

Figure 7:
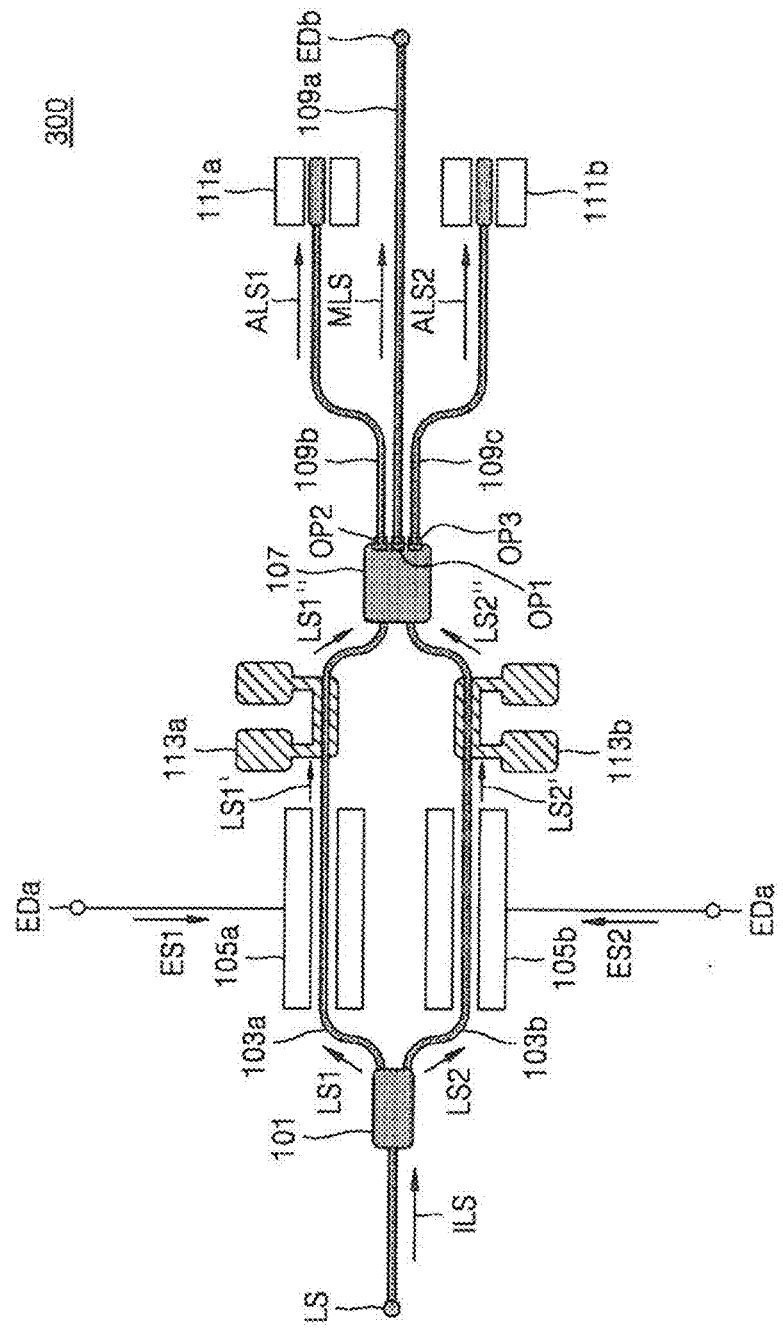

FIG. 7 is a view of an optical modulator 300 according to example embodiments of the inventive concept. The optical modulator 300 is similar to the optical modulator 100 of FIG. 1. However, the optical modulator 300 differs from the optical modulator 100 in that the optical modulator 300 further includes a first phase shifter 113a and a second phase shifter 113b in the first and second optical waveguides 103a and 103b, respectively.

Referring to FIG. 7, the first and second phase shifters 113a and 113b formed in the first and second optical waveguides 103a and 103b, respectively, may be used to set an initial phase modulation value, in addition to the phase modulation determined by the first and second electrical signals ES1 and ES2. That is, while the first and second optical signals LS1 and LS2 are phase-modulated into the first and second modulated optical signals LS1' and LS2' according to the first and second electrical signals ES1 and ES2, the first and second modulated optical signals LS1' and LS2' may be phase-modulated again into first and second re-modulated optical signals LS1" and LS2" by the first and second phase shifters 113a and 113b.

Referring to FIGS. 1 and 3 again, when the first and second electrical signals ES1 and ES2 are the same, the first and second optical signals LS1 and LS2 are modulated to have the same phase. Accordingly, a phase difference between the first and second modulated optical signals LS1' and LS2' that are input to the optical combiner 107 becomes 0°, and all output optical signals may be output as the main optical signal MLS, and the first and second auxiliary optical signals ALS1 and ALS2 may not exist, in this case, there is no value which may be measured by the first and second optical detectors 111a and 111b, and thus, monitoring of the main optical signal PALS may be rather destabilized and the efficiency of the optical modulator 100 may decrease.

Thus, even if there is no phase difference between the first and second modulated optical signals LS1' and LS2', the first and second phase shifters 113a and 113b may change initial phases such that some of the output optical signals are output as the main optical signal MLS and others of the output optical signals are output as the first and second auxiliary optical signals ALS1 and ALS2.

When there is no phase difference between the first and second modulated optical signals LS1' and LS2', the initial phases may be adjusted such that each of the main optical signal MLS and the first and second auxiliary optical signals ALS1 and ALS2 is output as a half intensity of its maximum intensity. That is, referring to FIG. 4 again, the first and second re-modulated optical signals LS1" and LS2" re-modulated by the first and second phase shifters 113a and 113b may be set to have an initial phase difference of 90°. That is, the first and second phase shifters 113a and 113b may be driven such that the phase difference of the first and second re-modulated optical signals LS1" and LS2" re-modulated after the first and second modulated optical signals LS1' and LS2' pass through the first and second phase shifters 113a and 113b is constantly maintained as 90°, when there is no phase difference between the first and second modulated optical signals LS1' and LS2'.

That is, when a phase difference of θ occurs between the first and second modulated optical signals LS1' and LS2' when the first and second electrical signals ES1 and ES2 are applied to the optical modulator 300, the first and second re-modulated optical signals LS1" and LS2" re-modulated via the first and second phase shifters 113a and 113b may further include an initial phase difference of 90°, in addition to the phase difference of θ between the first and second modulated optical signals LS1' and LS2' before the re-modulation.

As shown above, the method of adjusting the intensity of the main optical signal MLS to a half of its maximum intensity, when the first and second electrical signals ES1 and ES2 are not applied, is referred to as quadrature point biasing, and the quadrature point biasing may maximize the efficiency of the optical modulator 300.

It is illustrated that the first and second phase shifters 113a and 113b are located in the first and second optical waveguides 103a and 103b, respectively. However, the present inventive concept is not limited thereto. In some embodiments, the first or second phase shifter 113a or 113b may be located in any one of the first and second optical waveguides 103a and 103b.

In some embodiments, the first and second phase shifters 113a and 113b may be heaters.

In some embodiments, the optical splitter 101, the first and second optical waveguides 103a and 103b, the first and second electrodes 105a and 105b, the first and second phase shifters 113a and 113b, the optical combiner 107, the output optical waveguides 109a, 109b, and 109c, and the first and second optical detectors 111a and 111b may be arranged on or in a semiconductor substrate.

Figure 8:
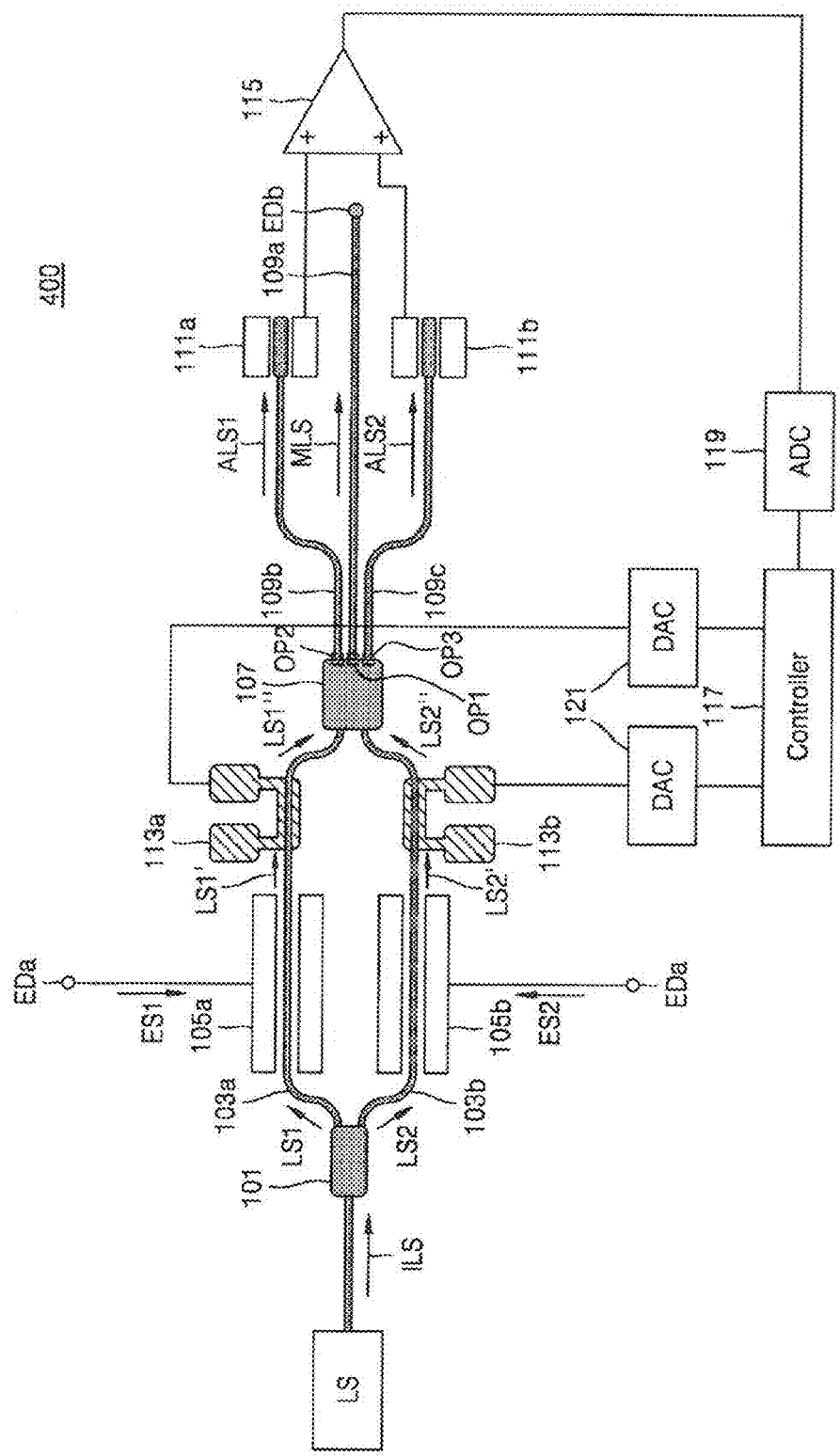
Figure 9:
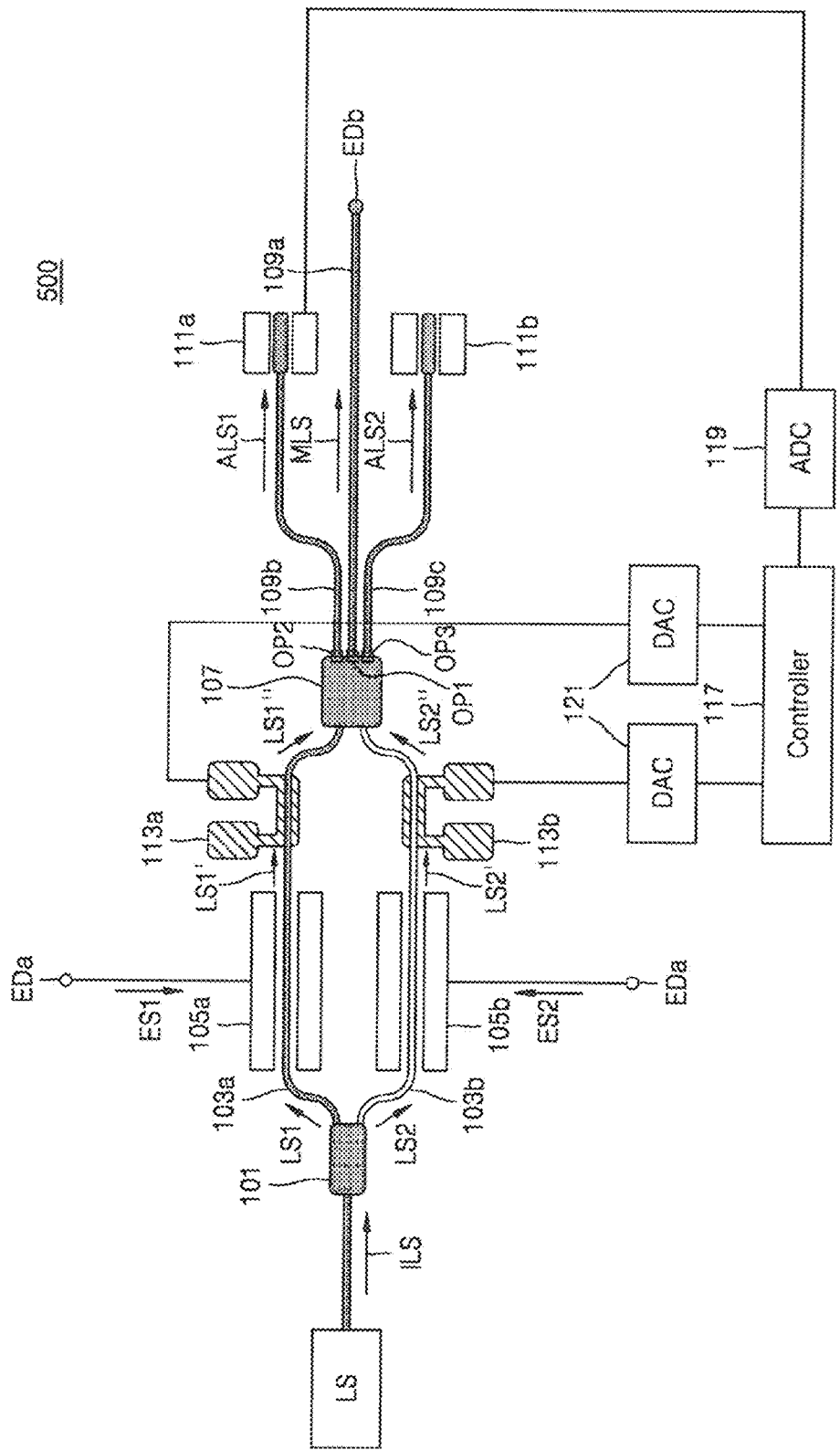
Figure 10:
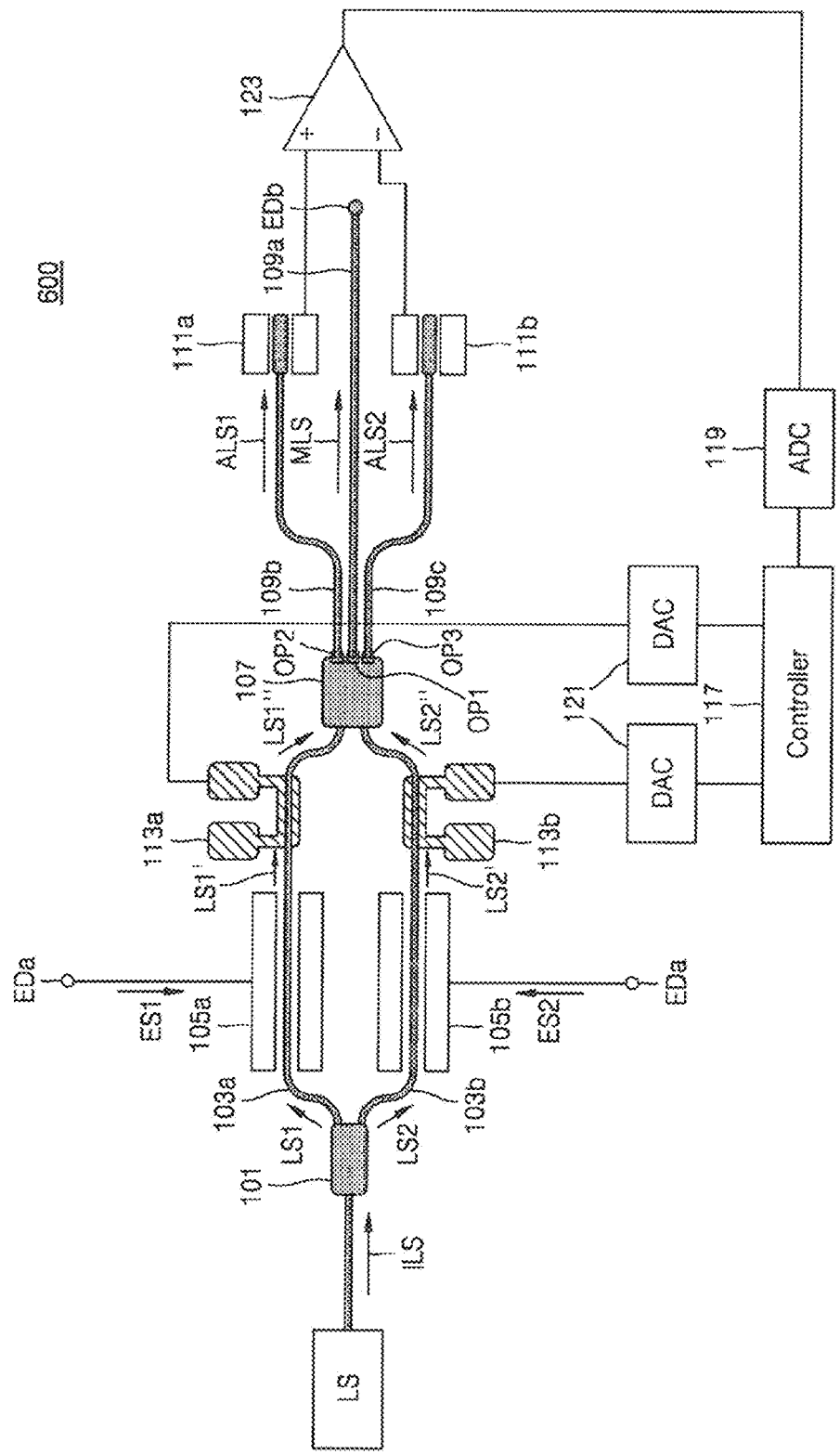

FIGS. 8 through 10 are views of optical modulators 400, 500, and 600 according to example embodiments of the inventive concept. The optical modulators 400, 500, and 600 are similar to the optical modulator 300 of FIG. 7. However, the optical modulators 400, 500, and 600 differ from the optical modulator 300 in that the optical modulators 400, 500, and 600 may further include a controller 117 for adjusting a modulation value of the first and second phase shifters 113a and 113b based on first and second detection signals measured by the first and second optical detectors 111a and 111b.

Referring to FIG. 8, the optical modulator 400 may further include the controller 117 connecting between the first and second optical detectors 111a and 111b, and the first and second phase shifters 113a and 113b, and setting and maintaining an initial phase modulation value of the first and second phase shifters 113a and 113b based on the first and second detection signals measured by the first and second optical detectors 111a and 111b, respectively. Accordingly, the optical modulator 400 may maintain the initial phase modulation value adjusted by the first and second phase shifters 113a and 113b, during the operation.

In detail, a maximum value and a minimum value of a sum of intensities of the first and second detection signals that are output via the first and second optical detectors 111a and 111b may be measured by increasing a voltage applied to at least one of the first and second phase shifters 113a and 113b, The controller 117 may adjust the operation such that a voltage corresponding to when the sum of the intensities of the first and second detection signals becomes a half of a sum of the maximum value and the minimum value is applied to the first and second phase shifters 113a and 113b.

An amplifier 115 for outputting the stun of the intensities of the first and second detection signals measured from the first and second optical detectors 111a and 111b, respectively, may be arranged between the first and second optical detectors 111a and 111b and the controller 117. The first and second detection signals output from the amplifier 115 may be input to the controller 117 via an analog to digital converter 119. The controller 117 may output an adjusting signal so that a proper voltage is applied to the first and second phase shifters 113a and 113b, based on the first and second detection signals. The adjusting signal may be transmitted to the first and second phase shifters 113a and 113b by the digital to analog converter 121. That is, a proper voltage may be applied so that the first and second phase shifters 113a and 113b maintain an initial phase modulation value, Referring to FIG. 9, the optical modulator 500 is similar to the optical modulator 400 of FIG. 8. However, the optical modulator 500 differs from the optical modulator 400 in that in the optical modulator 500, the controller 117 may operate based only on the first detection signal from the first optical detector 111a. That is, a proper voltage may be applied to the first and second phase shifters 113a and 113b so that an initial phase modulation value which is a half of a sum of a maximum intensity and a minimum intensity of the first auxiliary optical signal ALS1 is maintained.

Referring to FIG. 10, the optical modulator 600 is similar to the optical modulator 400 of FIG. 8. However, the optical modulator 600 differs from the optical modulator 400 in that in the optical modulator 600, the controller 117 may operate based on a difference of intensities of the first and second detection signals output via the first and second optical detectors 111a and 111b.

An amplifier 123 for outputting the difference of the intensities of the first and second detection signals measured from the first and second optical detectors 111a and 111b, respectively, may be arranged between the first and second optical detectors 111a and 111b and the controller 117.

Figure 11:
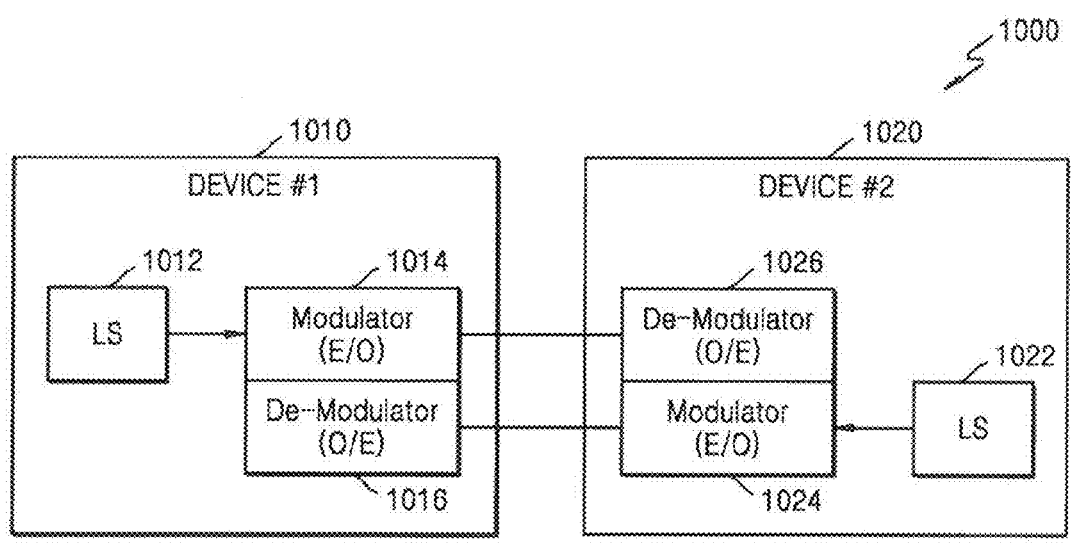
FIG. 11 is a block diagram of a data processing system according to example embodiments of the inventive concept.

FIG. 11 is a block diagram of a data processing system 1000 according to example embodiments of the inventive concept.

Referring to FIG. 11, the data processing system 1000 may include a first device 1010 and a second device 1020. The first device 1010 and the second device 1020 may communicate optical signals via serial communication.

The first device 1010 may include a first optical source 1012, a first optical modulator 1014 capable of performing electrical to optical conversion, and a first optical de-modulator 1016 capable of performing optical to electrical conversion.

The first optical source 1012 may output an optical signal having continuous waveforms. The first optical source 1012 may be the light source LS described with reference to FIG. 1.

The first optical modulator 1014 may be realized as any one of the optical modulators 100 through 600 described with reference to FIGS. 1 and 6 through 10.

The first optical demodulator 1016 may output a de-modulated electrical signal, in response to an output optical signal having de-emphasis waveforms output from a second optical modulator 1024 of the second device 1020 and de-modulating the received output optical signal.

The second device 1020 may include a second optical source 1022, the second optical modulator 1024, and a second optical de-modulator 1026.

The second optical source 1022 may output optical signals having continuous waveforms. The second optical source 1022 may be the light source LS described with reference to FIG. 1.

The second optical modulator 1024 may be realized as any one of the optical modulators 100 through 600 described with reference to FIGS. 1 and 6 through 10.

The second optical de-modulator 1026 may output a de-modulated electrical signal, in response to an output optical signal output from the first optical modulator 1014 of the first device 1010, and de-modulating the received output optical signal.

While the inventive concept has been particularly shown and described with reference to example embodiments thereof, it will be understood that various changes in for and details may be made therein without departing from the spirit and scope of the following claims.

What is claimed is:

1. An optical modulator comprising:
an optical splitter configured to split input optical signals into a first optical signal and a second optical signal and to transmit the first optical signal and the second optical signal to a first optical waveguide and a second optical waveguide, respectively;
an optical combiner configured to generate an output optical signal by combining the first and second optical signals transmitted from the first and second optical waveguides respectively, and comprising three output ports comprising a main output port, a first auxiliary output port, and a second auxiliary output port;
three output optical waveguides connected to the three output ports, respectively, and configured to transmit the output optical signal; and
an optical detector connected to at least one of the three output optical waveguides,
wherein the output optical signal comprises a main optical signal transmitted via a main optical waveguide, and a first auxiliary optical signal and a second auxiliary optical signal transmitted via first and second auxiliary optical waveguides, respectively, wherein an intensity of the main optical signal is the same as or greater than a sum of an intensity of the first auxiliary optical signal and an intensity of the second auxiliary optical signal, measured by the optical detector, and wherein a phase difference between the main optical signal and one of the first auxiliary optical signal and the second auxiliary optical signal is about 90°.

2. The optical modulator of claim 1, wherein the three output optical waveguides comprise the main optical waveguide connected to the main output port, the first auxiliary optical waveguide connected to the first auxiliary output port, and the second auxiliary optical waveguide connected to the second auxiliary output port, and wherein the optical detector is connected to at least one of the first and second auxiliary optical waveguides.

3. The optical modulator of claim 2, not comprising an optical waveguide divaricated from the main optical waveguide and connected to the optical detector.

4. The optical modulator of claim 1, further comprising a phase shifter located in at least one of the first and second optical waveguides.

5. The optical modulator of claim 4, wherein the phase shifter is configured to be driven such that a phase difference between the first and second optical signals is maintained as 90° after at least one of the first and second optical signals pass through the phase shifter.

6. The optical modulator of claim 1, further comprising a first electrode located in the first optical waveguide and configured to modulate a phase of the first optical signal according to a first electrical signal, wherein the output optical signal is generated by combining a first modulated optical signal having a phase modulated by the first electrode with the second optical signal.

7. The optical modulator of claim 6, further comprising a second electrode located in the second optical waveguide and configured to modulate a phase of the second optical signal according to a second electrical signal, wherein the output optical signal is generated by combining the first modulated optical signal with a second modulated optical signal having a phase modulated by a phase shifter.

8. The optical modulator of claim 1, wherein the optical splitter comprises a directional coupler, a Y-branch, or a multi-mode interferometer.

9. The optical modulator of claim 1, wherein the optical splitter, the optical combiner, the three output optical waveguides, and the optical detector are arranged on and/or in a semiconductor substrate.

10. The optical modulator of claim 1, wherein the first and second auxiliary output ports are each arranged apart from the main output port by a same distance, with the main output port between the first and second auxiliary output ports.

11. An optical modulator comprising:
an optical splitter configured to split input optical signals into a first optical signal and a second optical signal;
a phase shifter configured to modulate a phase of at least one of the first and second optical signals;
an optical combiner configured to combine the first and second optical signals and comprising three output ports;
at least one optical detector configured to receive a signal from at least one of three output optical signals that are output from the three output ports; and a controller connecting between the at least one optical detector and the phase shifter, and configured to control a phase modulation value of the phase shifter based on a detection signal measured by the at least one optical detector, wherein the three output optical signals comprise a main optical signal transmitted via a main optical waveguide, a first auxiliary optical signal transmitted via a first auxiliary optical waveguide, and a second auxiliary optical signal transmitted via a second auxiliary optical waveguide, wherein an intensity of the main optical signal is the same as a sum of an intensity of the first auxiliary optical signal and an intensity of the second auxiliary optical signal, measured by the at least one optical detector, and Wherein a phase difference between the main optical signal and one of the first auxiliary optical signal and the second auxiliary optical signal is about 90°.

12. The optical modulator of claim 11,
wherein the at least one optical detector comprises a first optical detector and a second optical detector configured to receive the first and second auxiliary optical signals, respectively.

13. The optical modulator of claim 12, further comprising an amplifier connected between the first and second optical detectors and the controller, and configured to output a sum of, or a difference between, intensities of a first detection signal and a second detection signal measured by the first and second optical detectors, respectively.

14. An optical modulator comprising:
an optical splitter configured to split an input optical signal into a plurality of optical signals;
an optical combiner connected to the optical splitter, configured to receive at least two of the plurality of optical signals, and configured to combine the at least two of the plurality of optical signals to generate a main output optical signal, a first auxiliary output optical signal, and a second auxiliary output optical signal; and
an optical detector connected to the optical combiner, wherein the optical detector is configured to receive the first and second auxiliary output optical signals and to determine a phase and/or intensity of the main output optical signal based on a phase and/or intensity of the first and second auxiliary output optical signals, wherein an intensity of the main output optical signal is not less than a sum of an intensity of the first auxiliary output optical signal and an intensity of the second auxiliary output optical signal, measured by the optical detector, and wherein a phase difference between the main output optical signal and one of the first auxiliary output optical signal and the second auxiliary output optical signal is about 90°.

15. The optical modulator of claim 14, further comprising:
a phase modulator connected to the optical splitter and configured to perform a modulation of a phase of an optical signal of the plurality of optical signals,
wherein the phase modulator is configured to adjust the modulation responsive to a determined phase and/or intensity of the first and second auxiliary output optical signals determined by the optical detector.

16. The optical modulator of claim 15,
wherein the phase modulator comprises a first phase modulator and a second phase modulator, wherein the first phase modulator comprises an electrode, and wherein the second phase modulator is configured to maintain a 90° phase difference between an input signal and an output signal of the second phase modulator.

17. The optical modulator of claim 14, wherein the optical combiner is configured to output the main output optical signal, the first auxiliary output, optical signal, and the second auxiliary output optical signal through a main output port, a first auxiliary output port, and a second auxiliary output port, and wherein the first auxiliary output port and the second auxiliary output port are disposed on opposite sides of the main output port and separated from the main output port by a distance that is the same.

18. The optical modulator of claim 1, wherein the main optical signal is near a maximum value when the first and second auxiliary optical signals are near a minimum value.

19. The optical modulator of claim 4, wherein the main optical signal is near a minimum value when the first and second auxiliary optical signals are near a maximum value.

20. The optical modulator of claim 15, wherein the intensity of the main output optical signal is the same as the sum of the intensity of the first auxiliary output optical signal and the intensity of the second auxiliary output optical signal.

* * * * *